Aug. 13, 1940.　　　B. DE PRUME　　　2,210,974
GRAPEFRUIT CUTTER
Filed Jan. 28, 1939
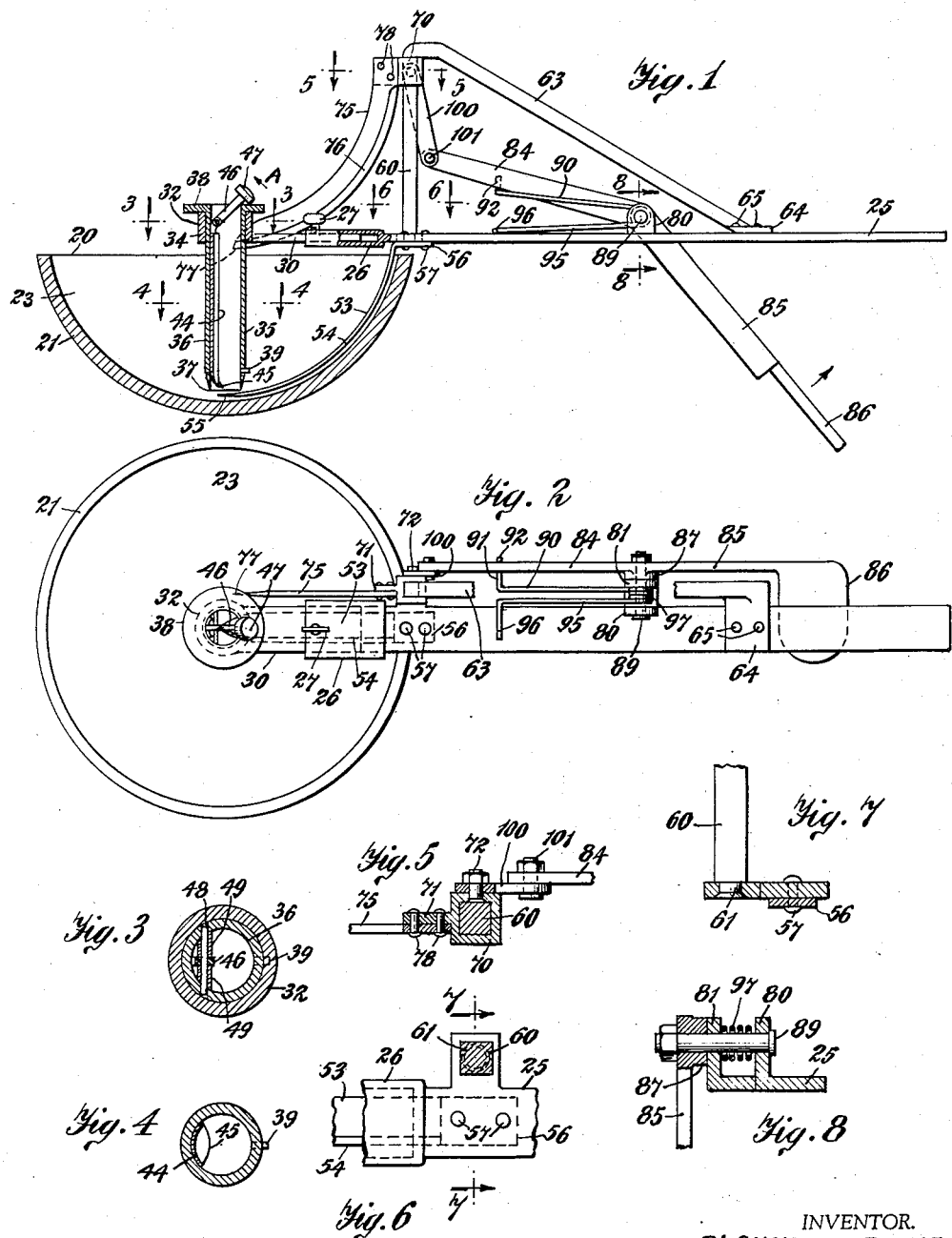
INVENTOR.
BLANCHE DE PRUME
BY A. A. de Bonneville
ATTORNEY.

Patented Aug. 13, 1940

2,210,974

UNITED STATES PATENT OFFICE 2,210,974

GRAPEFRUIT CUTTER

Blanche de Prume, New York, N. Y.

Application January 28, 1939, Serial No. 253,243

2 Claims. (Cl. 146—3)

This invention relates to a grapefruit cutter.

The object of the invention is the production of a grapefruit cutter, whereby a grapefruit or any similar fruit can be easily cut in small pieces from the skin thereof.

The second object of the invention is the production of a grapefruit cutter which can be easily operated, kept clean, and which is simple in construction.

Other objects will be evident from the specification and drawing.

In the accompanying drawing Fig. 1 represents a side elevation partly in vertical section of the grapefruit cutter in operative position, with a half portion of a grapefruit with its skin in section; Fig. 2 shows a top view of Fig. 1 with all its elements in full lines; Fig. 3 indicates an enlarged section of Fig. 1 on the line 3, 3; Fig. 4 is a section of Fig. 1 on the line 4, 4; Fig. 5 represents an enlarged section of Fig. 1 on the line 5, 5; Fig. 6 shows an enlarged section of Fig. 1 on the line 6, 6; Fig. 7 represents a partial section as on the line 7, 7 of Fig. 6 and Fig. 8 indicates an enlarged section of Fig. 1 on the line 8, 8.

The half portion of a grapefruit to be operated upon shown in partial axial section is designated in its entirety by the numeral 20. The skin of the grapefruit is shown at 21 and its interior portion is indicated at 23.

The grapefruit cutter, in this instance, comprises the handle 25, preferably rectangular in cross-section, and which at one end thereof has integral therewith the pocket 26, having the clamping screw 27 extending through a wall of said pocket. A supporting bar 30 has one end thereof adjustably positioned in the pocket 26, and is clamped in place by the clamping screw 27. A supporting sleeve 32, is integral with the outer end of the supporting bar 30. In the sleeve 32, is slidably supported the tubular core cutter designated in its entirety by numeral 35.

The tubular core cutter 35, comprises the cylindrical barrel 36 with the cutting edge 37, at its lower edge and the circular flange 38 at its upper end. A stop pin 39, extends from the lower portion of the barrel 36.

A cutter having the longitudinal cylindrical shaped barrel 44, is shown with the cutting edge 45, at its lower end. The barrel 44, has extending from its upper end the handle 46, with the knob 47.

The handle 46 is pivoted to the barrel 36 by means of the pin 48, the ends of which are secured in the barrel 36. Spacer tubes 49, on the pin 48, extend between the handle 46 and the inner face of the barrel 36.

An arcuate shaped cutter 53, is shown with the longitudinal cutting edge 54, the end cutting edge 55, and the upper flange 56. The flange 56 is fastened to the handle 25 by means of the rivets 57.

A guide post 60, in this instance rectangular in cross-section, has its lower end 61, riveted to the handle 25. From the upper end of the guide post 60 extends the brace 63, having the foot 64. The latter is fastened to the handle 25 by means of the rivets 65.

A cross head 70 is slidably positioned on the outer guide posts 60, and has extending from one side thereof the clamping lug 71, and a bolt 72 extends from the rear face of said cross head.

An arcuate shaped cutting blade 75, having the cutting edge 76 and the outer point 77, has its upper end fastened to the lug 71, by means of the rivets 78.

The handle 25 has integral therewith the journal bearing extensions 80 and 81 spaced from each other.

An operating arm comprises the members 84 and 85. The latter has integral therewith the handle 86. A bearing sleeve 87 connects and extends from the members 84 and 85. A journal pin 89 extends through the extensions 80 and 81 of the members 84 and 85, and the bearing sleeve 87. A spring is indicated with the arm 90, having the extension 91, with the upright end 92, and the arm 95 with the extension 96.

The arms 90 and 95 are connected by the helical coil 97, which is supported on the journal pin 89. The extension 96, bears on the upper face of the handle 25 and the extension 91, bears up against the lower face of the member 84, of the operating arm. A connecting lever 100, has one end pivoted on the bolt 72 and its other end is pivoted to the member 84 of the operating arm by the bolt 101.

To use the grapefruit cutter the user holds the halved portion 20 in one hand and grasps the handle 25 with the other hand, and forces the cutter 53 into the portion 23, adjacent to the skin 21, and thereby the portion 23, can be severed from the skin 21, by revolving the handle 25.

The operator then bears on the flange 38, and forces down the tubular core cutter 35 to the position indicated in Fig. 1, to sever the longitudinal portion of the core of the grapefruit from the portion 23.

Next, the operator swings the knob 47, in the direction of the arrow A, Fig. 1, and the cutting edge 45, of the cutter 45, severs the lower end of the core of the grapefruit from the interior portion 23. The user then swings up the handle 86, and thereby the cutting blade 75 descends against the tension of the spring having the arms 90 and 95, and slices the interior portion 23 in a practically vertical radial plane.

When the handle 86 is released, the tension of the spring having the arms 90 and 95, raises the cutting blade 75 clear of the half portion 20. The operator then swings the handle 25 in a horizontal plane for a predetermined amount and the cutting blades 75 is again lowered as described. By this means the portion 23, of the grapefruit is cut in a predetermined number of pieces which can be easily removed as required.

It will be noted that the stop pin 39, and the flange 38 prevent the cutter 35 becoming displaced.

Various modifications may be made in the invention and the present exemplification is to be taken as illustrative and not limitative thereof.

Having described my invention I claim:

1. In a fruit cutter the combination of a handle, a guide post extending up from the handle, a cross head slidably supported on the guide post, an arcuate shaped cutting blade extending from said crosshead, a journal pin supported by said handle, an operating arm having a pair of members supported on said journal pin, a connecting lever having one end pivoted to said crosshead and its other end pivoted to said operating arm, said arm adapted to be swung to force down said crosshead with its arcuate cutting blade and a spring having a pair of arms each with an extension and having a helical coil connecting its arms, said helical coil supported on said journal pin, the extension of one of the arms of the spring bearing on the handle of the fruit cutter and the extension of the other arm of said spring bearing against the bottom face of one of the members of the operating arm, to swing the operating arm in the reversed direction when released to raise said crosshead with its arcuate shaped cutting blade, said cutting blade adapted to cut the interior portion of a fruit operated upon, in a plurality of portions one after the other, when said fruit is positioned below the arcuate cutting blade of said crosshead.

2. In a grapefruit cutter the combination of a handle, a supporting sleeve at one end of the handle, a tubular core cutter slidably supported in said sleeve and adapted to longitudinally sever the core of the grapefruit operated upon, a cutter having a longitudinal cylindrical shaped barrel with a cutting edge at its lower end positioned in the tubular core cutter, said barrel having extending from its upper end a handle, said handle pivoted to the tubular core cutter, the cutting edge of the cutter within the tubular core cutter adapted to sever the lower end of the core of the grapefruit, an arcuate shaped cutter extending from said handle adapted to sever the interior of the grapefruit from its skin, a guide post extending from said handle, a cross-head slidably supported on said guide post and having a lug integral therewith, an arcuate shaped cutting blade extending from said lug and means to reciprocate the cross-head with its cutting blade to sever the interior of the grapefruit at different portions thereof.

BLANCHE DE PRUME.